Oct. 28, 1952 G. C. SZIKLAI 2,615,975
COLOR TELEVISION RECEIVING SYSTEM
Filed July 30, 1948
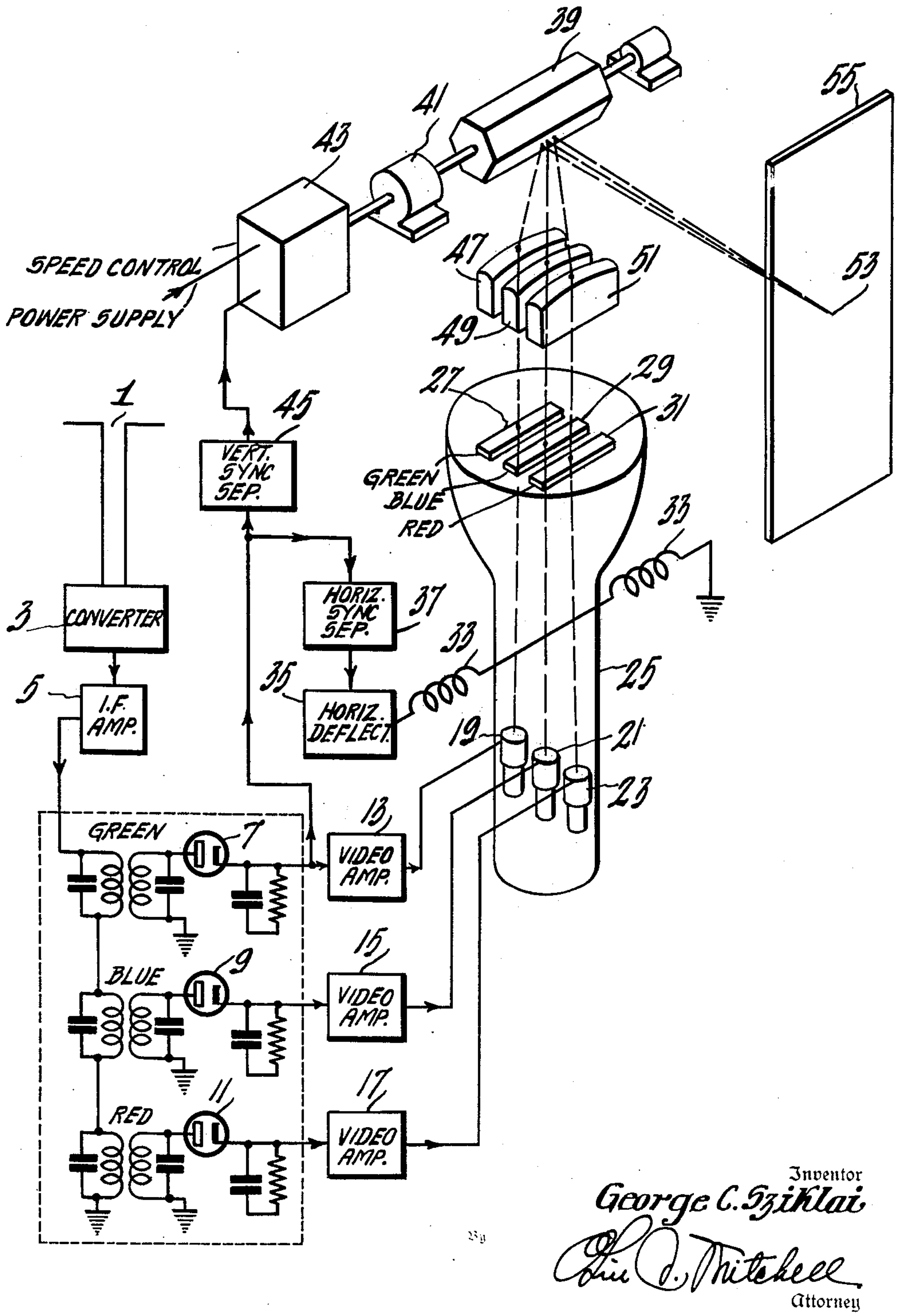
Inventor
George C. Sziklai
[signature]
Attorney Patented Oct. 28, 1952

2,615,975

UNITED STATES PATENT OFFICE 2,615,975

COLOR TELEVISION RECEIVING SYSTEM

George C. Sziklai, Princeton, N. J., assignor to Radio Corporation of America, a corporation of Delaware Application July 30, 1948, Serial No. 41,692

6 Claims. (Cl. 178—5.4)

This invention relates to television, and more particularly to receiving set arrangements for the reception of images in substantially their natural color.

In color television systems wherein image reproduction is accomplished by positioning in registry a group of color component images representative of selected component colors which together add to produce a resultant image in substantially its natural color, the image is broken down not only into its elemental areas but into independent signal trains representative of each of the selected component colors of the image.

Heretofore the formation of images in substantially their natural color has been accomplished by the production of several independent component color images to be optically combined on a projection screen. Such an arrangement is well shown and described in an article entitled "An Experimental Simultaneous Color Television System," beginning on page 861 of the "Proceedings of the Institute of Radio Engineers" for September 1947. In this article referred to, particular attention is directed to part III, beginning on page 871, wherein the popular "trinescope" is shown and described.

Upon an examination of the description and theory of operation of the trinescope it will be readily understood that mechanical and optical precision is important to insure that the several images are projected in registry on the image projection screen.

In order to overcome the relatively stringent requirements for mechanical and optical accuracy, there have been proposed a number of arrangements wherein the image screen of the image reproducing tube is divided into elemental areas of the several selected component colors to utilize a single electron target area for forming the several component color images in optical registry. Such an arrangement is well shown and described in the copending U. S. applications of Alfred N. Goldsmith, entitled "Color Television," Serial No. 548,238, filed August 5, 1944, now Patent No. 2,481,839, issued September 13, 1949.

In the copending application of Alfred C. Schroeder entitled "Picture Reproducing Apparatus," Serial No. 730,637, filed February 24 1947, now Patent No. 2,595,548, issued May 6, 1952, a cathode ray tube for reproducing television images in color is proposed wherein a plurality of electron beams is developed closely together and all of the beams are deflected by a single deflection system common to all. Each of the electron beams is modulated by the signal representations of the selected component colors of the televised image.

In the practice of the several inventions referred to immediately above, it is necessary to provide a multiple element electron target screen which, even in its simplest form, is sometimes very complicated.

According to this invention, advantage is taken of the proposal to employ a single deflection arrangement for several electron guns. Furthermore, only a limited portion of the deflection field will be used, which inherently simplifies the registration of the three electron beams providing the three color images. The remainder of the necessary deflection or scanning is done optically.

According to this invention, an image reproducing system is provided wherein a plurality of electron guns is employed to form and control the intensity of an electron beam in accordance with selected component color image signal trains. An electron target area for each of the electron beams is provided and electronic means deflect the electron beams only in the relatively rapid or horizontal direction. An image projection screen is provided upon which an optical system projects the light formed on all electron targets in registry, and a rotatable multiple element reflector is positioned between the electron target area and the image projection screen to scan the image screen in the vertical or relatively slow direction.

A primary object of this invention is to provide an improved color television image reproducing system.

Another object of this invention is to provide for improved registry of selected color component images in color image reproduction.

Other and incidental objects of the invention will be apparent to those skilled in the art from a reading of the following specification and an inspection of the accompanying drawing which shows schematically and by block diagram one form of this invention.

Turning now in more detail to the drawing, there is illustrated a color television image signal receiving arrangement which may, for example, take the form of the receiver shown and described in the article on color television systems published in the "Proceedings of the Institute of Radio Engineers" for September 1947, and referred to above. In the particular form shown by the example in the drawing, a television receiving antenna 1 is coupled to a converter 3 which provides intermediate frequency amplifier 5 with suitable energy.

The signal energy from the intermediate frequency amplifier 5 is divided in accordance with color component information in the several detectors 7, 9 and 11.

The separation of the different component color image signals is quite well explained in the color television art and it is not intended here to go into detail regarding such operation, as it is not intended that any specific form be employed.

There is, however, an improved arrangement for the separation of image signals in accordance with their color representation in my copending U. S. application entitled "Signal Separator," Serial No. 760,400, filed July 11, 1947, wherein an arrangement is disclosed to provide for efficient amplification of independent signal trains representing selected component colors of a composite image signal. The combined signal trains are amplified to a predetermined level before separation and then are amplified independently of one another. The amplifier characteristics are chosen to provide a maximum of efficiency.

The several component color image representative signals are then amplified in appropriate video amplifiers 13, 15 and 17 to be applied respectively to appropriate control electrodes 19, 21 and 23 of the image reproducing tube 25.

Tube 25 is provided with three strip-like targets 27, 29 and 31.

Electron targets 27, 29 and 31 are of green, blue and red light producing material or, in accordance with well known arrangements, are of a white light producing phosphor with an associated color filter of, for example, like size and shape, as illustrated schematically in the drawing.

The three component color light producing electron targets 27, 29 and 31 are closely spaced to provide for maximum accuracy in electronic deflections. The electronic deflection in preferably the horizontal direction, which in accordance with present day standards is the relatively rapid direction of scanning, is accomplished by deflection coils 33, which in turn receives its synchronizing energy from the green color component signal channel through horizontal sync separator 37.

In accordance with well known scanning procedures it is, of course, not only necessary to scan in one direction, but it is necessary to scan in a second direction which is substantially perpendicular to the first direction of scanning.

In view of the fact that present day television standards provide for a relatively slow rate of vertical scanning and a rate which may easily be provided for by mechanical arrangements which can be designed and conveniently produced with extreme accuracy, this invention employs a rotatable multiple element reflector 39 which is driven by motor 41, which is controlled to synchronism by speed control arrangement 43.

Speed control 43, shown schematically in the drawing, may take any of the well known forms. One suitable type is shown and described in my copending U. S. application entitled "Speed Control System," Serial No. 668,447, filed May 9, 1946, now Patent No. 2,531,834, issued November 28, 1950.

According to my copending application referred to immediately above, a motor drives a set of switch contacts. A second set of switch contacts rotates with the driven means. The two sets of contacts are so associated that when there is a discrepancy between rates of rotation of the two sets of contacts, the resulting angular displacement causes a variation in the effective current supplied to the non-synchronous or power motor driving the driven means.

The speed control 43 obtains its power as indicated and its synchronization with the vertical speed of scanning through vertical sync separator 45.

Although in the particular form of the invention shown synchronizing energy is obtained through the green color component channel, synchronizing information may, of course, be obtained in any of the well known manners.

Although a motor 41 and a speed control arrangement 43 are illustrated, motor 41 may, for example, be of the synchronous type.

A suitable optical system including lenses 47, 49 and 51 is employed to project the several points of scansion on targets 27, 29 and 31 together in registry at point 53 on the image projection screen 55.

It will, of course, be understood that the persistence of the luminescent material of target areas 27, 29 and 31 must be short enough that light information will not be carried over from one line to the next line.

The several selected component colors may, as indicated, consist of red, blue and green. Other suitable component or primary colors may be employed.

It will be seen that due to the absence of the vertical electronic scanning, the scanning beams scan three well defined lines, thus permitting good registry since they pass through closely the same portion of the deflection field.

Due to the close proximity of the beams in the deflection field, any electron optical aberration effect, such as pincushion or barrel distortion, will be minimized, since obviously the distortions of the three lines will be similar to the extent that the lines will be both parallel and of the same length.

All lenses 47, 49 and 51 may, for example, be of the cylindrical type to provide high efficiency or they may be narrow sections of a spherical lens.

The mirror drum 39 will rotate at a rate of $f_v/N_s$, wherein $f_v$ is the vertical scanning frequency and $N_s$ is the number of flat surfaces.

It will be seen that accurate registry adjustment may be made by stopping motor 41 and adjusting lens sections 47, 49 and 51.

Having thus described the invention, what is claimed is:

1. A color television image reproducing system comprising in combination a plurality of electron beam forming electron guns each including beam intensity control means, means whereby each of said beam intensity control means receives a signal train representative of one different selected color component of an object, an electron target for said electron beams, beam deflection means for deflecting said beams in parallel planes to develop scanning points moving in one direction, an image projection screen, a rotatable multiple element light reflector optically positioned between said electron target area and said image projection screen, means whereby said rotatable multiple element light reflector is caused to scan said image projection screen with said scanning points in a direction substantially perpendicular to the direction said beams are deflected by said beam deflecting means and means including an optical system to focus the scanning points of all of said electron beams in substantial image registry to form a natural color image on said image projection screen.

2. The invention as set forth in claim 1 and wherein there are three electron guns.

3. The invention as set forth in claim 1 and wherein said beam deflection means consists of at least one deflection coil.

4. The invention as set forth in claim 1 and wherein said beam deflection means deflects said beam in the relatively rapid scanning direction and said reflector causes said points to scan said screen in the relatively slow scanning direction.

5. The invention as set forth in claim 1 and wherein said beam deflecting means causes each of said beams to be deflected along one different line only.

6. The invention as set forth in claim 5 and wherein said different lines consist of different light producing elements corresponding to the selected color components applied to said beam intensity control means.

GEORGE C. SZIKLAI.

REFERENCES CITED

The following references are of record in the file of this patent:

UNITED STATES PATENTS

| Number | Name | Date |
|---|---|---|
| 2,163,540 | Clothier | June 20, 1939 |
| 2,173,476 | Goldmark | Sept. 19, 1939 |
| 2,265,657 | Von Ardenne | Dec. 9, 1941 |
| 2,294,820 | Wilson | Sept. 1, 1942 |
| 2,337,980 | Dumont | Dec. 28, 1943 |
| 2,389,646 | Sleeper | Nov. 27, 1945 |

FOREIGN PATENTS

| Number | Country | Date |
|---|---|---|
| 508,037 | Great Britain | June 26, 1939 |
| 528,090 | Great Britain | Oct. 22, 1940 |